United States Patent [19]

Yang

[11] 4,376,637

[45] Mar. 15, 1983

[54] APPARATUS AND METHOD FOR DESTRUCTIVE REMOVAL OF PARTICLES CONTAINED IN FLOWING FLUID

[75] Inventor: Lien C. Yang, La Canada, Calif.

[73] Assignee: California Institute of Technology, Pasadena, Calif.

[21] Appl. No.: 196,877

[22] Filed: Oct. 14, 1980

[51] Int. Cl.³ .................... B03C 3/01; B03C 3/88; F01N 3/38

[52] U.S. Cl. .................................... 55/2; 55/6; 55/12; 55/96; 55/105; 55/126; 55/131; 55/138; 55/139; 55/283; 55/291; 55/466; 55/DIG. 25; 55/DIG. 30; 55/270; 55/145; 60/275; 60/303; 60/311; 422/121; 422/169; 422/178; 422/186; 210/748

[58] Field of Search .................... 55/6, 12, 13, 2, 96, 55/105, 106, 124–126, 127, 128, 131, 138, 139, 145, 282, 283, 291, 466, DIG. 30, DIG. 25, 108, DIG. 10, 270; 60/275, 303, 311; 422/169, 176, 178, 186, 121; 210/748; 23/28; 324/71 CP

[56] References Cited

U.S. PATENT DOCUMENTS

| | | | |
|---|---|---|---|
| 1,442,052 | 1/1923 | Dane | 55/145 |
| 2,593,377 | 4/1952 | Wintermute | 55/6 |
| 2,594,805 | 4/1952 | Rommel | 55/139 |
| 2,771,150 | 11/1956 | Welts | 55/105 |
| 2,783,647 | 3/1957 | Stuart | 73/861.05 |
| 2,860,723 | 11/1958 | Wintermute | 55/105 |
| 3,043,096 | 7/1962 | McLoughlin | 55/466 |
| 3,157,479 | 11/1964 | Boles | 60/275 |
| 3,233,173 | 2/1966 | Lees et al. | 324/71 CP |
| 3,511,030 | 5/1970 | Hall et al. | 55/105 |
| 3,524,303 | 8/1970 | Stoddard | 55/283 |
| 3,768,258 | 10/1973 | Smith et al. | 55/131 |
| 3,827,217 | 8/1974 | Volsy | 55/121 |
| 4,010,011 | 3/1977 | Reif | 55/127 |
| 4,140,005 | 2/1979 | Kittelson | 73/28 |
| 4,283,207 | 8/1981 | Martyniuk | 55/282 |

FOREIGN PATENT DOCUMENTS

| | | | |
|---|---|---|---|
| 370254 | 3/1923 | Fed. Rep. of Germany | 55/126 |
| 1261295 | 2/1968 | Fed. Rep. of Germany | 55/126 |
| 2360483 | 6/1975 | Fed. Rep. of Germany | 55/106 |
| 2519609 | 11/1976 | Fed. Rep. of Germany | 60/311 |
| 2709434 | 9/1978 | Fed. Rep. of Germany | 60/303 |
| 2917491 | 11/1980 | Fed. Rep. of Germany | 60/303 |
| 55-48009 | 9/1980 | Japan | 55/DIG. 30 |

OTHER PUBLICATIONS

Cobine, James, Gaseous Conductors, Theory and Engineering Applications, 1958, pp. 143 & 144.

Primary Examiner—David L. Lacey
Attorney, Agent, or Firm—Freilich, Hornbaker, Wasserman, Rosen & Fernandez

[57] ABSTRACT

An apparatus and method for destructively removing particles from a flowing gas containing the particles. In the specific embodiments disclosed the apparatus is adapted to remove carbon particles from diesel engine exhaust products. The exhaust products are directed to a predetermined location where they are rapidly vaporized and combine with oxygen in the exhaust products to form carbon dioxide. Vaporization in one embodiment is effected by a discharge grid 30 located within an exhaust conduit 22, the grid 30 being chosen so that alternate conductors 32 and 34 defining the grid 30 are spaced apart a distance approximately 125 times the mean diameter of the particles to be removed. A voltage differential of approximately 690 volts is applied across adjacent conductors 32 and 34. Presence of a diesel exhaust particle between these conductors 32 and 34 is sufficient to create an electric spark discharge enveloping the particle, thereby resulting in a rapid vaporization and oxidation of the particle. In a further embodiment, a filter 145 is provided in an exhaust conduit 146. A light beam from a pulse laser 148 is directed at the filter 145 via a light directing conduit 150 or an optical fiber bundle 168. The pulse laser 148 is triggered to generate a light beam when particle build up at an inner surface of the filter 145 reaches a predetermined level. The pulse laser 148 is chosen to have an output light beam having sufficient energy to vaporize carbon particles accumulated on the filter 145 surface.

39 Claims, 18 Drawing Figures

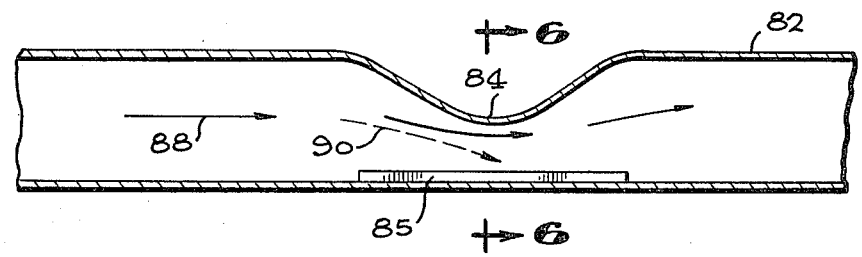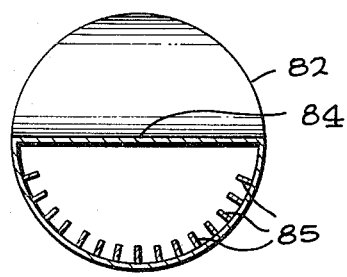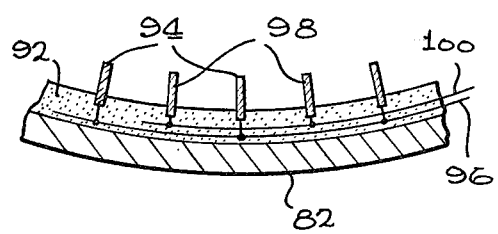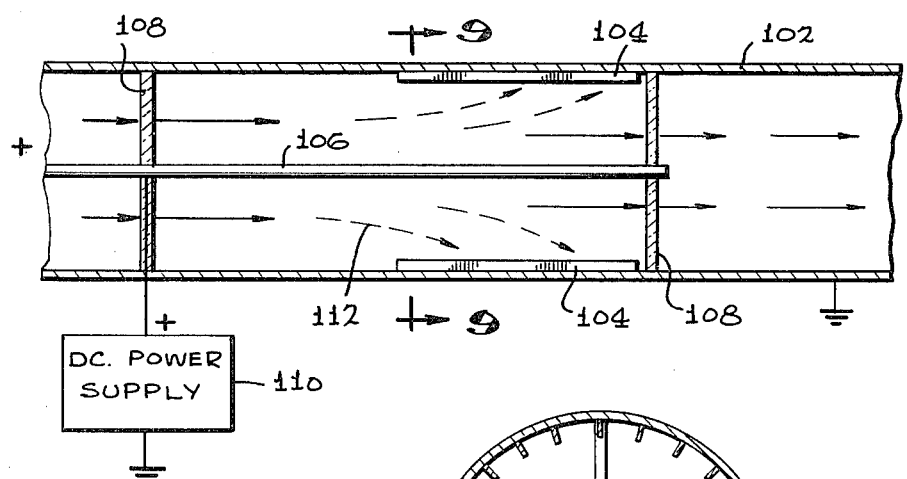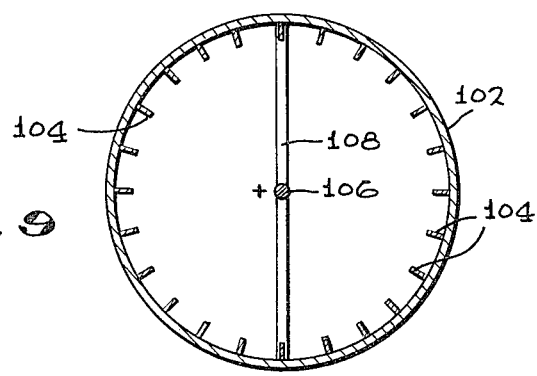

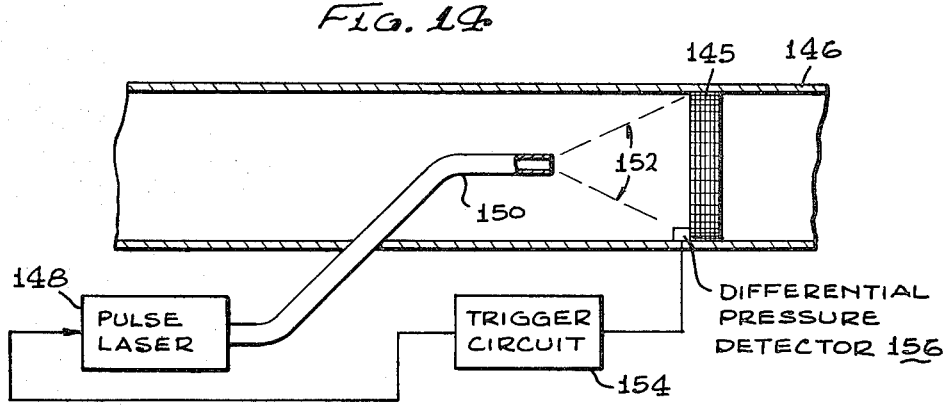
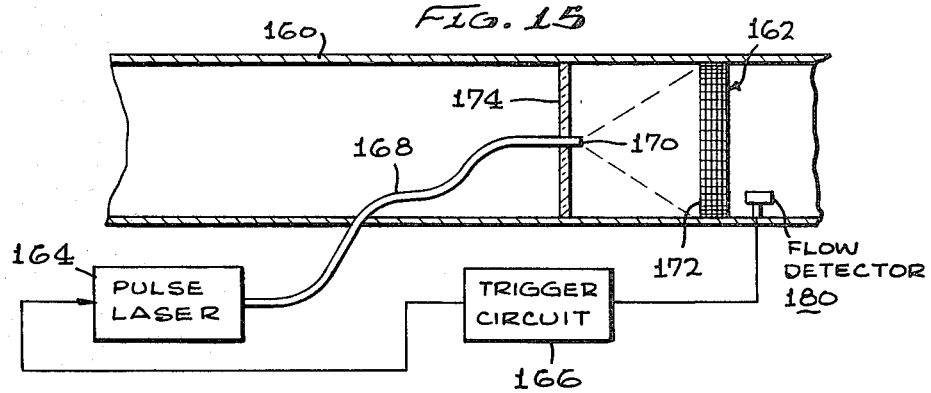
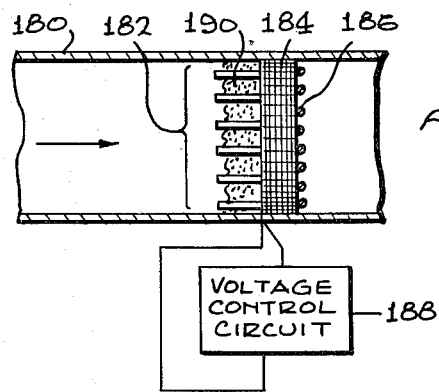
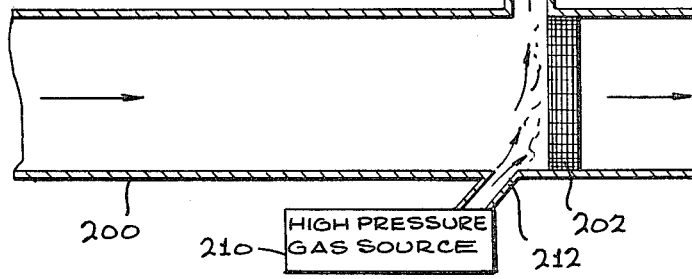

APPARATUS AND METHOD FOR DESTRUCTIVE REMOVAL OF PARTICLES CONTAINED IN FLOWING FLUID

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

TECHNICAL FIELD

The invention relates to a method and apparatus for removing particulate matter from a flowing fluid and more specifically for pollution control wherein pollutant particles are removed from a flowing gas.

BACKGROUND ART

Particulate emissions in the exhaust products of a variety of devices ranging from automobiles to steel mills frequently are a limiting factor in the usefulness of such devices because of environmental considerations. Apparatus for isolating and preventing particulate emissions from reaching the atmosphere are many and varied. One specific problem has been control of particulate emissions from an internal combustion engine such as a diesel engine. Due to their higher efficiency, diesel engines have frequently been considered as one way to alleviate gasoline fuel shortages. Diesel gas pollutant emissions have been reduced to an acceptable level; however particulate emissions which are more severe in a diesel engine than in a gasoline engine still have not been reduced sufficiently from an environmental point of view. Diesel engines currently utilized for automobiles produce up to two grams of particulates per mile of opration. This number has to be reduced substantially in order for the automobile diesel engine to become a truly acceptable alternative to the gasoline engine.

Considerable automotive industry efforts are being undertaken to solve this problem. Several approaches are being considered which include: (1) modifying engine design to reduce particulate formation, (2) adding chemicals to fuel to suppress particulate formation, and (3) filtering the particulates using in-situ catalysts at the engine exhaust temperature which is about 330° F. To data none of these approaches have been very successful. Approach (1) is difficult because the combustion process in a diesel is not well understood. Approach (2) is not highly desirable because additives may generate additional pollutants and induce engine deposits. Approach (3) is not yet satisfactory because diesel exhaust tempeatures are too low for an efficient catalytic reaction, and conventional filtering of the particulates presents a maintenance problem in that approximately one gallon of particulates is generated each one thousand miles. Use of heating elements for heating the diesel particulates until they oxidize has been found to be energy inefficient and introduces difficult engineering design problems.

The present invention solves the above problems by providing an apparatus and method for destructively removing particles from the diesel exhaust by vaporizing the particulates so that they combine with oxygen to form carbon dioxide.

STATEMENT OF THE INVENTION

The invention provides an apparatus and method for destructively removing particles from a flowing fluid containing the particles. The apparatus includes a first means for directing the particles to a predetermined location, and a second means at the predetermined location for vaporizing the particles so that they will chemically combine with other portions of the flowing fluid, thereby destructively removing the particles from the flowing fluid.

In an exemplary embodiment of the invention for removing carbon particles from a diesel engine exhaust, an electric discharge grid is provided which includes alternately spaced conductors having a voltage differential provided therebetween. The conductors are spaced apart a relatively large distance with respect to the size of the diesel particulates. In one specific embodiment the spaced-apart distance is approximately one hundred and twenty five times the particulate size. The voltage differential is chosen so that the presence of a single particle between adjacent conductors causes an electric spark discharge to occur, the spark discharge enveloping the particle and immediately heating it to a temperature above 4,000 degrees Kelvin. This extremely high temperature causes the carbon particles to combine with oxygen in the exhaust, thereby forming carbon dioxide. In another embodiment the grid elements are spaced further apart and a particle concentration is allowed to build up prior to initiation of an electric spark discharge. This increases efficiency of particle destruction. In addition, the high heat generated by the electric spark discharge can also induce self-sustained combustion of the particles, thereby further increasing efficiency. The invention also discloses apparatus for increasing particle concentration at a discharge grid located on the inner surface of an exhaust conduit, thereby maximizing the possibility of a single spark discharge enveloping more particles than would normally be enveloped without particle concentration and increasing the overall efficiency of the removal system. One configuration disclosed for increasing particle concentration accelerates the particles in an off-axis direction with respect to a center line of the exhaust conduit, thereby increasing particle concentrations at the inner surface of the exhaust conduit where the discharge grid is located. Another apparatus for concentrating particles at the inner surface of the conduit provides a longitudinally-extending electrode in the center of the exhaust conduit, the electrode having an electrical charge which is imparted to the flowing particles. The flowing particles thus having the same electrical charge as the conductors are repelled by the conductor, and therefore tend to concentrate along the inner surface of the exhaust conduit where the discharge grid is located.

In a still further embodiment of the invention, a filter is located in the exhaust conduit, the filter being chosen to block passage of the carbon particles while allowing the exhaust gases to pass therethrough. A periodically generated laser light beam is directed to the filter surface blocking the particles. The laser light beam is chosen to have sufficient energy to vaporize all of the particles blocked by the filter, thereby causing formation of carbon dioxide which then passes through the filter.

BRIEF DESCRIPTION OF THE DRAWINGS

FIG. 5 is a cross-sectional view of an automobile exhaust conduit showing one embodiment for directing particles to the discharge grid;

FIG. 6 is a cross-section taken along line 6—6 of FIG. 5;

FIG. 7 is an enlarged view showing a portion of the discharge grid as it is attached to the exhaust conduit;

FIG. 8 is a cross-section of an automobile exhaust conduit showing a centrally positioned electrode for directing the particles towards the discharge grid;

FIG. 9 is a cross-section taken along line 9—9 of FIG. 8;

FIG. 14 is a cross-section of an automobile exhaust conduit showing a laser and a light reflecting conduit for directing an output beam from the laser to a filter;

FIG. 15 is a cross-section of a further embodiment of the apparatus of FIG. 14 wherein the laser output beam is directed to the filter through an optical fiber bundle;

FIG. 16 is a cross-section of an exhaust conduit showing an embodiment of the invention wherein an agglomeration of carbon particles is utilized to initiate an electric spark discharge; and FIG. 17 is a cross-section of an embodiment of the invention wherein an agglomeration of particles is accumulated in a first conduit and transferred to a second conduit for destructive removal.

BEST MODE FOR CARRYING OUT THE INVENTION

Detailed illustrative embodiments of the invention disclosed herein exemplify the invention and are currently considered to be the best embodiments for such purposes. They are provided by way of illustation and not limitation of the invention. Various modifications thereof will occur to those skilled in the art, and such modifications are within the scope of the claims which define the present invention.

As previously explained, the invention provides a means for destructively removing particles from a flowing fluid containing the particles. In a specific embodiment described below, the particles are carbon particulate matter contained in the exhaust products of a diesel engine. The particles are directed by various means to an electric discharge grid which has a voltage differential applied between adjacent conductors forming the grid. In one embodiment described below, the voltage differential between adjacent conductors is chosen so that a particle passing therebetween will initiate an electric spark discharge which envelopes and vaporizes the particle. The high temperature of the vaporized particle causes it to combine with oxygen in the exhaust products to form carbon dioxide. Destructive removal as used herein means effecting a sufficient alteration of the characteristics of the particle so that it can no longer be identified as the original particle. Thus, conversion of a carbon particle to carbon dioxide as above described results in a destructive removal of the particle. In a further embodiment of the invention, particles are allowed to agglomerate prior to initiation of an electric spark discharge. In a still further embodiment of the invention, a filter is used in lieu of the discharge grid. The filter is chosen to block passage of the carbon particles while passing other gases present in the exhaust products. An output beam from a periodically pulsed laser is directed to the filter, the laser being chosen to provide an output beam having sufficient energy to vaporize the carbon particles being blocked by the filter. Although the specific embodiments described below are related to removing particulate matter from internal combustion engine exhaust products, it should be understood that the invention is in no way limited to such an application. The various embodiments described below can also be utilized to remove particulate matter from many other types of flowing gases. For example, the apparatus provided by the invention could be utilized in the exhaust stack of a steam generating plant utilizing coal as its power source, thereby removing particulate matter from exhuast products created by burning coal.

Figure 1:
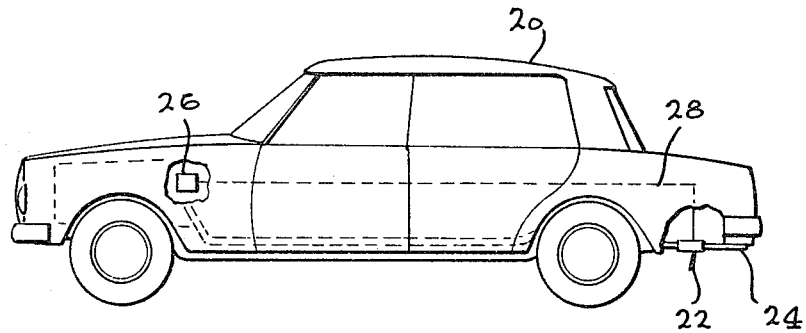
FIG. 1 is a pictorial diagram showing a particle removal apparatus provided by the invention installed in an automobile.

Referring now to FIG. 1, an automobile 20 utilizing a diesel engine as its power source is shown having a particle removing device 22 located along an exhaust pipe or conduit 24 which is connected to an exhaust manifold (not shown) of the diesel engine. A power source 26 is located in a forward portion of the automobile 20, and is connected to the particle removing device 22 via a connection line 28. In operation, all of the exhaust products of the diesel engine are passed through the particle removing device 22 prior to being expelled into the atmosphere. As previously indicated, however, the invention is not limited to a diesel engine, and could be utilized in any application wherein small particles are to be removed from a flowing gas.

Diesel particulates typically are formed of carbon and are between 0.1 and 1.0 micron in size. Most automobile diesel engines generate between 0.2 and 1.0 grams of carbon particulates for each mile of travel. These particulates being formed of carbon are slightly conductive. When they are subjected to high temperatures above 4,000 degrees Kelvin they combine with oxygen present in the exhaust products to form carbon dioxide. The various embodiments disclosed below subject the diesel particulates to these high temperatures, thereby destructively removing them from the exhaust products by oxidation. It is known that most diesel engine exhaust products have sufficient oxygen contained therein to completely oxidize all of the carbon particles prior to their entering the atmosphere. However, air could be added to the diesel exhuast products should more oxygen be required for complete oxidation.

Figure 2:
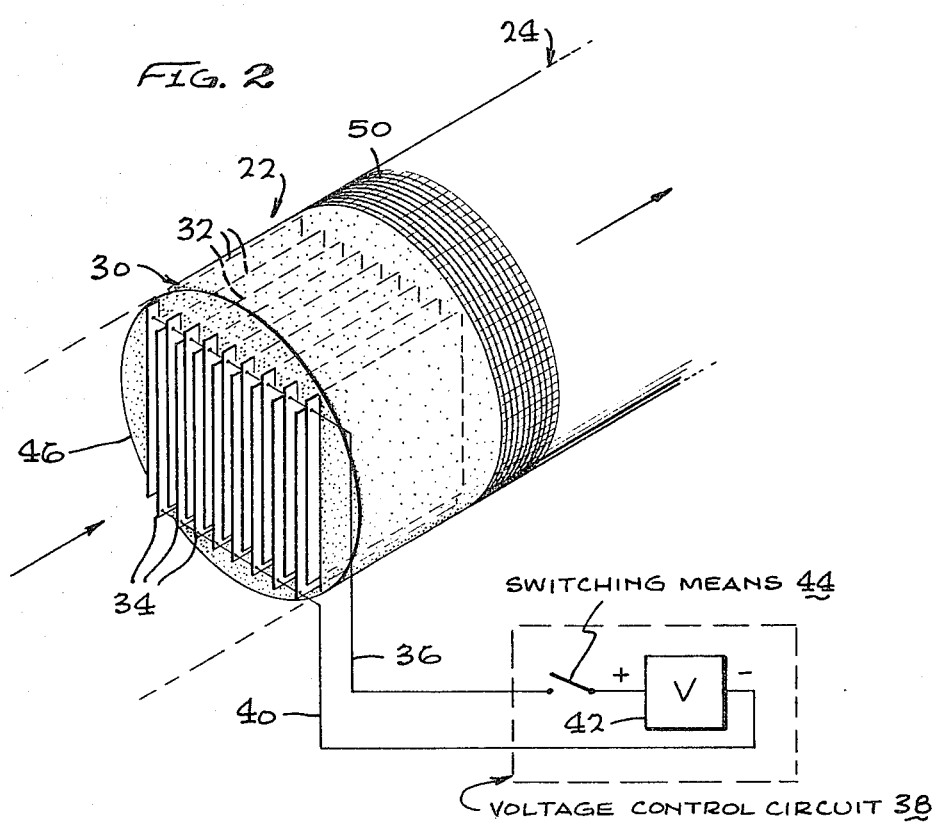
FIG. 2 is a perspective diagram showing the discharge grid and filter installed in an automobile exhaust conduit.

In a first embodiment of the invention, an electric discharge grid is utilized to vaporize the particles prior to oxidation, or to initiate their combustion if particle concentration is sufficiently high. Referring now to FIG. 2, the particle removing device 22 includes a discharge grid 30 which is formed of a plurality of first conductors 32 and a plurality of second conductors 34 which are alternately mounted with respect to each other. Although only a few conductors 32 and 34 are shown in the discharge grid 30, for the diesel particulate removal application the first and second conductors 32 and 34 are spaced apart 125 micrometers, thereby resulting in eighty conductors per linear centimeter. However, the spacing could be somewhat wider or narrower. Thus, many more conductors are provided than those shown in FIG. 2. The first conductors 32 are interconnected by a first interconnection line 36, this line being connected to one terminal of a voltage control circuit 38 which could be located adjacent to the particle removal device 22 or the power source 26 shown in FIG. 1. A second interconnection line 40 interconnects the second conductors 34, and is connected to the other terminal of a voltage control circuit 38. As will be described in further detail below, the voltage control circuit 38 includes a high voltage power supply 42 and a switching means 44 for controlling application of the output of the high voltage power supply 42 across alternate first and second conductors 32 and 34, respectively. In this embodiment, the conductors are fabricated from 0.005 inch thick brass foil. The conductor material should be of the type that is chemically resistant and maintains its characteristics at high temperatures. Examples of such materials include molybdenum, copper, platinum and gold. The conductors 32 and 34 are secured by a heat resistant insulator such as a ceramic insulator 46 formed to position the conductors 32 and 34 in the exhaust conduit 24. Although not essential, a filter 50 is located so that it abuts against end surfaces of the conductors 32 and 34. The filter is chosen so that it will block the carbon particles and allow exhaust gases to pass therethrough. The particles thus blocked initiate electric spark discharges across the conductors 32 and 34.

Before proceeding further, the process by which a particle initiates an electric spark discharge between adjacent conductors will be described. From classical electrostatic theory, the following equation describes the effect of a particle on an electric field surrounding the particle $$E_A = \left( \frac{3\epsilon}{\epsilon + 2} \right) E_O$$

where $\epsilon$ is the dielectric constant of the medium forming the particle, $E_O$ is the field strength in the absence of the particle, and $E_A$ is the field strength immediately adjacent to the particle in the forward and backward positions relative to the field. Thus, it can be seen that for a dielectric constant of two, the particle increases the field strength in its vicinity by a factor of 1.5. If the conductors creating the field strength have a sufficiently large voltage differential between them, the increased field strength caused by the particle will initiate an electric spark discharge between the two conductors. An interesting phenomena, and one that is vital to this embodiment, is that this field strength magnification occurs regardless of particle size for particles having dimensions much smaller than the separation between adjacent conductors 32 and 34. Thus, if the voltage differential is properly chosen, any particle regardless of its size will initiate an electric spark discharge. It has been empirically found that a voltage differential of 690 volts across conductors spaced apart by 125 micrometers is sufficient for a diesel exhaust particle to initiate an electric spark discharge. Of course, it is possible that when a group of particles is between two conductors, the differential voltage required to initiate an electric spark discharge is less than that required for a single particle.

The processes by which the initiated electric spark discharge vaporizes the particle are fairly complex. However, it is theorized that at least four distinct processes occur simultaneously. The first process merely involves heating the particle to such a high temperature that is vaporizes and then oxidizes. The temperature within an electric spark discharge is theorized to be greater than 4,000 degrees Kelvin. The heat penetration depth L of a particle subjected to a sudden increase in temperature is approximated by the formula $\kappa \tau \approx L^2$, where $\kappa$ is the thermal diffusivity of the particle material, $\tau$ is the time duration of the temperature increase, and L is the penetration depth of the increased temperature. A typical electric spark discharge lasts about 1 microsecond. Thermal diffusivity for carbon is approximately $10^{-2}$ cm$^2$/sec. Thus the penetration depth L is approximately equal to $\sqrt{\kappa \tau}$ or $10^{-4}$ centimeters. Therefore it can be seen that a typical electric spark discharge will completely vaporize a one micron size particle. The second process by which the particle is vaporized, and then oxidized, is ion etching. The high flow rate of ions within an electric spark discharge corona results in high speed ions bombarding or etching the particle surface, thereby removing a portion which is immediately vaporized by heat within the spark. It is theorized that ion etching removes several thousand angstroms of material from a one micron particle. The third process results from chemical reaction kinetics. The oxidation or combustion process is accelerated as temperature increases, thus resulting in complete oxidation in microseconds at temperatures greater than 4,000 degrees Kelvin. The fourth process results in an increased rate of oxidation due to oxygen ions in the spark corona.

Referring again to FIG. 2 it can be seen that if the switching means 44 switches at a sufficiently high rate, all of the particles passing between the first and second conductors 32 and 34 will initiate electric spark discharges so long as the conductor dimensions are sufficiently large. Additional embodiments to be described below provide a means for concentrating the particles at the discharge grid so that each electric spark discharge is more likely to vaporize more than one particle, thereby increasing efficiency of the apparatus by lowering the power required to destructively remove all of the particles.

Figure 3:
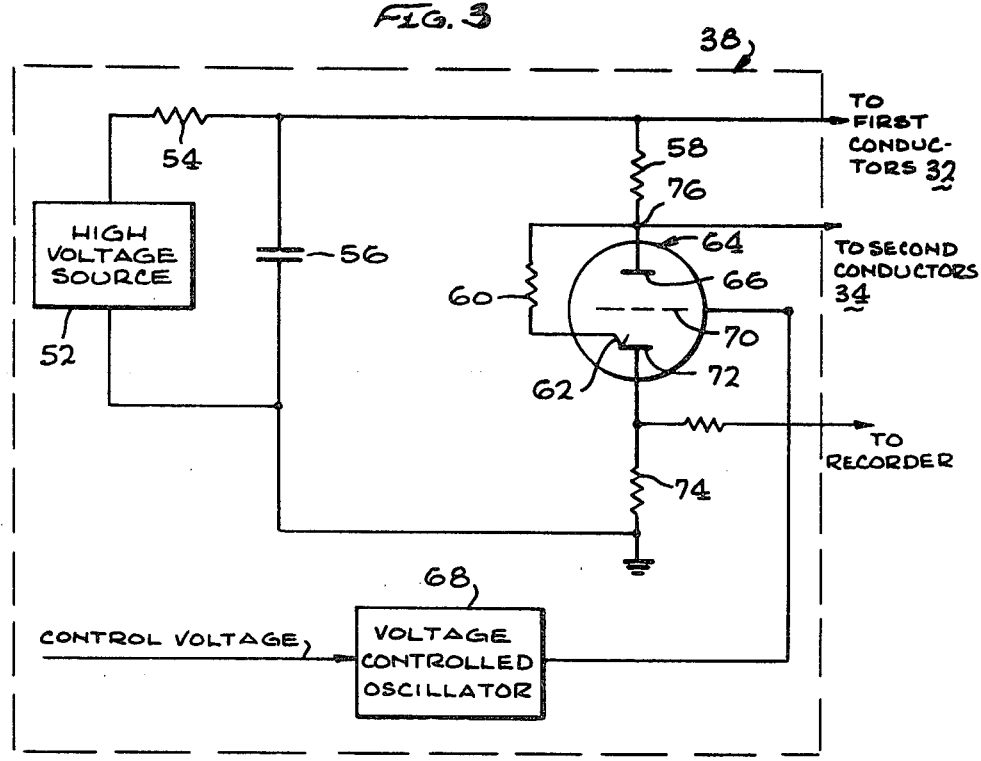
FIG. 3 is a circuit and block diagram and the voltage control circuit shown in FIG. 2.

The voltage control circuit 38 of FIG. 2 is shown in FIG. 3. A high voltage source 52 is connected through a first current limiting resistor 54 to a discharge capacitor 56. The first and second conductors 32 and 34 are connected to each other through a second current limiting resistor 58 which in turn is connected through a third current limiting resistor 60 to a control electrode 62 of a krytron tube 64. The krytron tube 64 could be an EG&G KN-22 krytron, or any other triggerable high voltage spark gap or switch. An anode 66 of the krytron 64 is also connected through the third current limiting resistor 60 to the control electrode 62. A voltage controlled oscillator 68 is connected to a biasing grid 70 of the krytron tube 64. The voltage controlled oscillator 68 is chosen to trigger the krytron tube 64 at a predetermined rate in accordance with a control voltage input signal. A cathode 72 of the krytron 64 is connected through a resistor 74 to ground. In operation, the voltage controlled oscillator 68 is controlled to allow the krytron 64 to conduct at predetermined time intervals at least as frequent as the rate at which the particles discharge the grid 30. As soon as the krytron 64 conducts, point 76 is essentially shorted to the resistor 74, thereby placing the voltage differential across the discharge capacitor 56 across the first and second conductors 32 and 34 and the resistor 74. If a particle is between any of the conductors 32 and 34 at the time the krytron 64 conducts, an electric spark discharge is initiated, thereby destroying the particle and providing a current flow through the resistor 74. A signal related to the current flowing through the resistor 74 is provided to a recorder (not shown), this signal being related to the number of particles in the exhaust products. Use of the voltage controlled oscillator 68 to interrupt conduction of the krytron 64 is important. Otherwise, a large particle could be trapped by the conductors 32 and 34, thereby creating a short circuit across the conductors. This would prevent the discharge capacitor 56 from being recharged by the voltage source 52 and would result in a continuous flow of current across the conductors trapping the particle.

Figure 4:
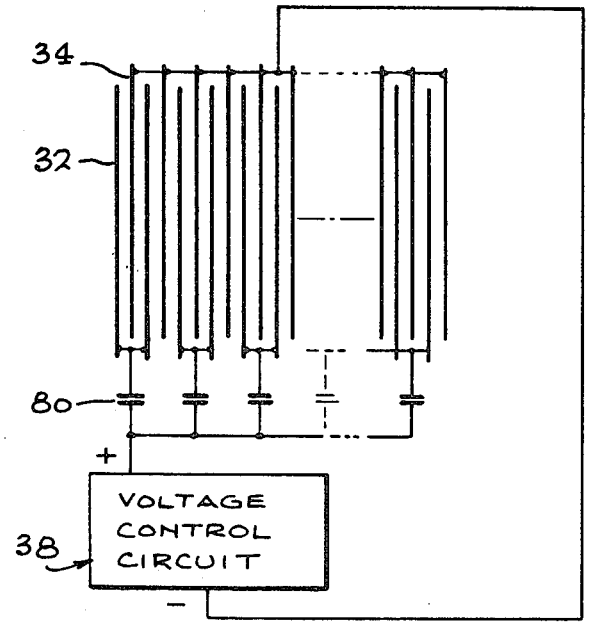
FIG. 4 is a block and circuit diagram of an alternative connection of the voltage control circuit to the discharge grid for maximizing the rate of spark generation.

FIG. 4 shows an alternate configuration for connecting the first conductors 32 to the voltage control circuit 38. Each pair of first conductors 32 are interconnected and connected to a separate intermediate discharge capacitor 80 which is also connected to the voltage control circuit 38. Thus each time the krytron 64 is triggered, each pair of first conductors can sustain one electric spark discharge, thereby increasing the number of electric spark discharges which can be effected during each triggering cycle. This configuration greatly increases the ability of the discharge grid to destructfully remove a large number of particles. Although in this embodiment only two of the first conductors are connected to a single intermediate discharge capacitor 80, three or more first conductors could have been connected to each intermediate discharge capacitor, thus decreasing the number of discharge capacitors required. Although discharge capacitors 80 are shown in FIG. 4, other types of storage and discharge circuits could be utilized. For example, a choke, a transformer, or a plurality of distributed chokes or capacitors could be utilized to control the duration and pulse shape of the discharge. It is believed that control of the discharge pulse shape may lead to increased particle destruction efficiency.

FIGS. 5 and 6 show cross-sectional views of a diesel engine exhaust conduit 82. The exhaust conduit 82 is formed so that its cross-sectional area decreases at a location indicated at 84. A discharge grid 85 is formed of a plurality of longitudinally extending conductors which are located along the inner surface of the exhaust conduit 82. In operation, as the exhaust products flow in a direction indicated by the arrow 88, their velocities increase as the cross-sectional area decreases. This increased velocity results in an increased inertia being experienced by the flowing particles. The increased inertia causes the particles to tend to follow a straight path as shown by the dotted line 90, thereby increasing the density of particles at the inner surface of the exhaust conduit 82 where the discharge grid 85 is located. This increased particle density increases the efficiency of the discharge grid 85 by raising the probability of more than one particle being enveloped by a single electric spark discharge. It is of course possible to provide a plurality of discharge grids 85 along the exhaust conduit 82 to be used in conjunction with a plurality of decreased cross-sectional areas 84 as above described.

Referring to FIG. 7, mounting of the longitudinally-extending conductors forming the discharge grid 85 can be seen. A mounting material such as a heat resistant ceramic 92 is provided along the inner surface of the exhaust conduit 82. First conductors 94 are interconnected via a first interconnection wire 96 contained within the ceramic 92. Similarly, second conductors 98 are interconnected by a second interconnection line 100. All of the longitudinally-extending conductors in the embodiments described below are mounted in this manner. Thus the specific mounting details will not be repeated in the following discussion, nor shown in the associated drawings.

Referring now to FIGS. 8 and 9, another embodiment for concentrating particles at a discharge grid is shown. An exhaust conduit 102 has a discharge grid 104 formed of longitudinally-extending conductors located around its inner surface. Centrally mounted within the exhaust conduit 102 is a longitudinally-extending electrode 106 which is held by non-conductive holding brackets 108. A high voltage DC power supply having an output voltage of approximately 20,000 volts is connected to the electrode 106 for providing a positive charge thereon. However, the power supply 110 could have been connected to provide a negative charge to the electrode 106. As the particles flow by the electrode 106 they pick up a charge having the same polarity as the charge on the electrode 106. Thus with the electrode 106 and the particles having the same polarity charge, the particles are repelled from the electrode 106 and towards an inner surface portion of the exhaust conduit 102 as indicated by the dotted lines 112. This repelling increases the concentration of particles along the inner surface of the exhaust conduit 102, thereby increasing particle density at the discharge grid 104.

Figure 10:
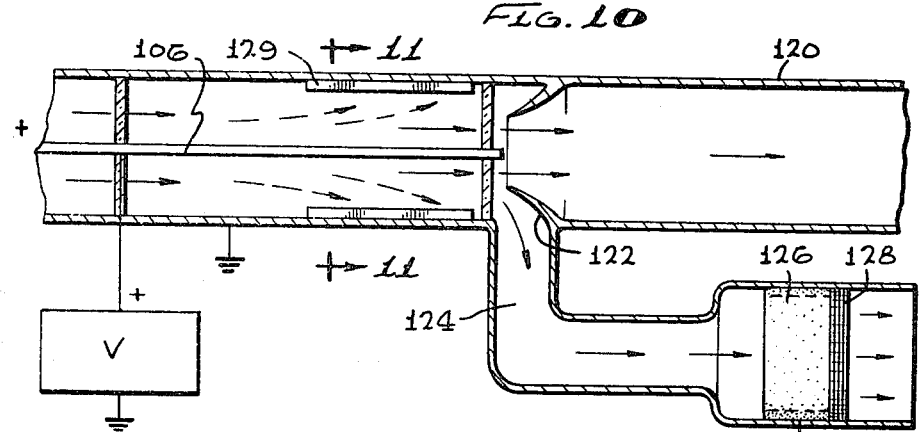
FIG. 10 is a cross-section of an automobile exhaust conduit showing a further embodiment of the invention utilizing two discharge grids.
Figure 11:
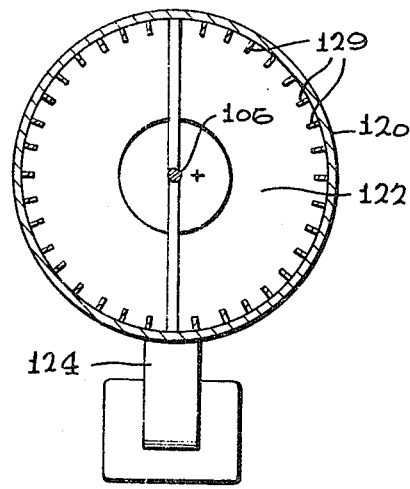
FIG. 11 is a cross-section taken along line 11—11 of FIG. 10.

Referring now to FIGS. 10 and 11, an embodiment for increasing the capture of particles driven towards the inner surface of the conduit by the apparatus of FIGS. 8 and 9 is shown. Here, an exhaust conduit 120 has formed in its inner surface an annular scoop 122 that extends inwardly towards the flowing exhaust products. Exhaust products flowing adjacent to the inner surface of the conduit 120 are captured by the annular scoop 122 and directed into a second conduit 124 having a discharge grid 126 and a filter 128 installed therein as described in the discussion relating to FIG. 2. This embodiment thus provides a further means for destructively removing any particles not destroyed by a discharge grid 129 in the exhaust conduit 120.

Figure 13A:
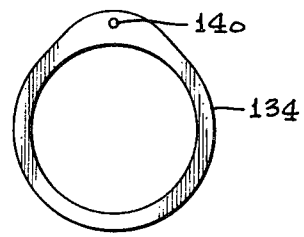
FIGS. 13A and 13B show orientation of the individual conductors utilized in the FIG. 12 embodiment.
Figure 12:
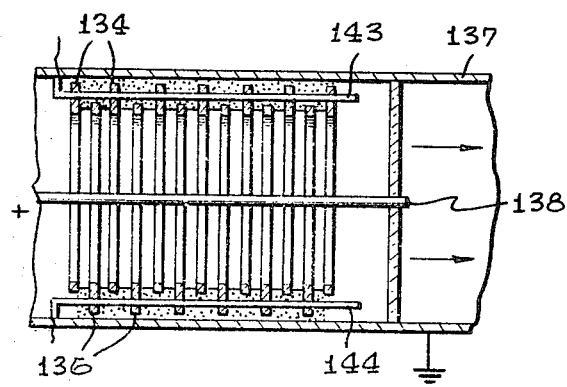
FIG. 12 is a cross-section of an automobile exhaust conduit showing an alternative discharge grid configuration for the embodiment of FIG. 8.
Figure 13B:
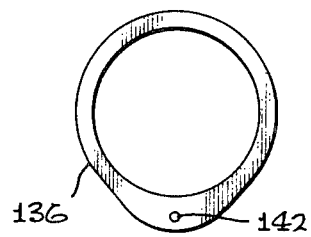

Another type of discharge grid to be used in the embodiments of FIGS. 8 and 10 can be seen in FIGS. 12, 13a and 13b. Here, a plurality of conductive rings 134 and 136 are located within an exhaust conduit 137. A longitudinally-extending electrode 138 having a positive charge thereon is also provided as described in the discussion associated with FIGS. 8 and 9. First rings 134 are oriented so that a hole 140 formed therein is located at an upper portion of the conduit 137 as shown in FIG. 13A. Second rings 136 are oriented as shown in FIG. 13B so that a hole 142 formed therein is located at a lower portion of the exhaust conduit 137. A first interconnection conductor 143 is located so that it extends through all of the holes 140 and makes electrical contact with all of the first rings 134. Similarly, a second interconnection conductor 144 is located so that it extends through all of holes 142 and makes electrical contact with all of the second rings 136. As can be appreciated, circular conductors of the type above described can be readily installed and interconnected.

In a still further embodiment of the invention shown in FIG. 14, a filter 145 is located within an exhaust conduit 146, the filter 145 being of the type that blocks the exhaust particles and passes the exhaust gases created by a diesel engine. A pulse laser 148 is provided, the laser 148 having an output light beam which is directed by a light reflecting conduit 150, which could be a quartz light pipe, to the filter 145 surface as indicated by the dotted lines shown at 152. An advantage of the light reflecting conduit 150 is that a small flow of gas can be maintained through the conduit to prevent contamination of its inner surface by carbon particles. A trigger circuit 154 for pulsing the pulse laser 148 is provided, the trigger circuit 154 being responsive to a differential pressure detector 156 which provides an output signal related to the pressure differential across the filter 145. Whenever this pressure differential increases above a predetermined pressure, an output signal will be provided by the trigger circuit 154 for causing the pulse laser 148 to generate an output laser beam. The pulse laser 148 is chosen to be of the type having sufficient power output to cause the particulate matter trapped on the filter 145 surface to vaporize. Pulser lasers suitable for this purpose are well known in the art, one type of which is a 16.0-joule laser described on pages 37–39 of the July 1973 issue of Laser Focus Magazine and described in my U.S. Pat. No. 4,027,273 entitled Compact Pulse Laser Having Improved Heat Conductance. Utilizing a 16.0-joule laser, it is theorized that the filter 145 should have a diameter of about 1", and the light reflecting conduit 150 should be positioned so that the dotted lines 152 subtend an angle of approximately sixty degrees. One type of laser that would be appropriate is a carbon dioxide laser that provides a 10.6 micron wavelength output light beam. Because the carbon particles are black, they tend to absorb the laser energy more efficiently than if they were of a lightreflecting color.

A still further embodiment utilizing a laser is shown in FIG. 15 wherein an exhaust conduit 160 has a filter 162 provided therein as in the FIG. 14 embodiment. A pulse laser 164 and a trigger circuit 166 are also provided. A light beam output from the pulse laser 164 is directed through an optical fiber bundle 168 so that light radiating from its end 170 will irradiate an inner surface 172 of the filter 162. Holding brackets 174 are provided to securely position the optical fiber bundle 168 in the conduit 160. A flow detector 180 is also provided, the trigger circuit 166 being chosen to cause the pulse laser 164 to generate an output light beam whenever the gaseous flow rate as measured by the flow detector 180 drops below a predetermined flow rate. Thus, whenever particulate build-up on the inner surface 172 of the filter 162 is sufficiently great to reduce gas flow through the filter 162, the flow detector 180 will cause the pulse laser 164 to generate a laser light beam, thereby oxidizing the particulate matter on the filter surface 172.

Another embodiment of the invention utilizes field enhancement between conductors which is caused by an agglomeration of carbon particles rather than by a single particle as previously explained. As used herein, agglomeration is defined as 2 or more particles being either in close proximity to or in contact with each other. Referring to FIG. 16, an exhaust conduit 180 has installed therein a discharge grid 182 of the type shown in FIG. 2 except that here there is a relatively large spacing between conductors such as 0.050 inches. However, this spacing could vary considerably. A filter 184 is provided for passing gases while blocking the carbon particles. A wire mesh 186 is provided to support the filter 184. A voltage control circuit 188 is provided for periodically applying a voltage potential across adjacent conductors for initiating an electric spark discharge when there is an agglomeration of carbon power or particles as indicated at 190. Emperical testing has shown that initiating the electric spark discharge through a powder formed of carbon particles is an energy-efficient way of effecting their destructive removal. Also, self sustained combustion of the carbon powder until all paricles have been destructivefully removed is more likely in this embodiment.

FIG. 17 shows a first exhaust conduit 200 having a filter 202 installed therein for blocking carbon particles so that an agglomeration thereof will accumulate on the front surface of filter 202. A second conduit 204 in fluid communication with the first conduit 200 has installed therein a grid 206 and filter 208 as described in conjunction with FIG. 16. Periodically, a high pressure gas source 210 provides a jet of high pressure gas, which could be pressurized atmosphere gas, which is directed at the front surface of filter 202 through a third conduit 212, thereby dislodging the particle agglomerate accumulated thereon. Simultaneously with release of high pressure gas from the gas source 210, a vacuum pump 216 is activated for drawing exhaust products through the second conduit 204. The vacuum pump 216 could be a fan for example. After the carbon agglomerates have been drawn into the grid 206, a voltage is applied across adjacent conductors by a voltage control circuit 220 as described in conjunction with FIG. 16. Although this exemplary embodiment utilizes a gas source for dislodging the particle agglomeration, other dislodging means could be utilized such as a mechanical vibrator or scraper. In addition, the vacuum pump may not be required if a pressure differential across the filter 202 is sufficient to draw the exhaust gases therethrough.

What is claimed is:

1. An apparatus for removing particles from a flowing gas containing said particles comprising:
    means for so directing the flowing gas as to pass said particles through a predetermined location; and
    means for destructively removing said particles, said means being constructed and arranged to provide a spark discharge when said particles pass through said predetermined location.

2. The apparatus of claim 1 wherein said means for destructively removing said particles comprises:
    a plurality of conductors located at said predetermined location, each of said conductors being spaced from adjacent conductors to form a spark discharge grid; and
    means for applying a voltage between adjacent ones of said conductors to generate an electric spark discharge between adjacent ones of said conductors in the presence of said particles located between said adjacent ones of said conductors, whereby said electric spark discharge destructively removes said particles.

3. The apparatus of claim 2 including a conduit for containing said gas flow, wherein said predetermined location is in said conduit and said conduit is part of an exhaust system of an internal combustion engine with gas flow in the direction of the axis of said conduit, and said gas and particles are exhaust products of said internal combustion engine, said plurality of conductors being comprised of a plurality of plates oriented parallel to the axis of said conduit so that said exhaust products will flow therebetween.

4. The apparatus of claim 3 further comprising filter means for passing said gas and blocking said particles, said filter means being located substantially adjacent to and downstream from said conductors so that said gas will flow therethrough after having passed between said plurality of conductors whereby particles concentrate between said plurality of conductors.

5. The apparatus of claim 2 wherein said means for applying a voltage between adjacent ones of said conductors comprises:
 a DC power supply having an output voltage terminal and a return terminal; and
 means for applying a portion of a voltage between said output voltage terminal and said return terminal to adjacent ones of said conductors.

6. The apparatus of claim 5 wherein said conductors are in two groups designated as first conductors and second conductors, and said first and second conductors are alternately located with respect to each other, said means for applying a voltage between adjacent ones of said conductors further comprising:
 a plurality of energy storage devices each having an input and an output terminal;
 means for connecting an output terminal of each of said energy storage devices to one or more of said first conductors;
 means for connecting said energy storage device input terminals to said DC power supply output voltage terminal; and
 means for connecting said second conductors to said power supply return terminal.

7. The apparatus of claim 6 wherein said energy storage devices are capacitors.

8. The apparatus of claim 5 wherein said means for applying a voltage between adjacent ones of said conductors further comprises control means for providing said voltage differential portion across adjacent conductors only during predetermined time intervals.

9. The apparatus of claim 2 in combination with an internal combustion engine wherein said gas and particles are exhaust products of said internal combustion engine, said means for directing said particles to a predetermined location comprises a conduit for containing said exhaust products, said conductors are attached on an inner portion of said conduit along one side thereof, and said conduit is formed on a side opposite said conductors to direct said exhaust products at said inner surface portion of said conduit to which said conductors are attached.

10. The apparatus of claim 2 in combination with an internal combustion engine wherein said gas and particles are exhaust products of said internal combustion engine, and wherein said means for directing said particles to a predetermined location comprises:
 a first conduit for containing said exhaust products with flow in the direction of the axis of said conduit;
 a longitudinally-extending electrode disposed in said first conduit with its axis parallel to the axis of said first conduit;
 means for providing a voltage potential to said electrode with respect to said first conduit whereby said particles will become charged by, and thus repelled by, said electrode, thereby repelling said particles towards an inner surface portion of said first conduit; and
 means for locating said plurality of conductors defining said discharge grid along said inner surface portion of said first conduit.

11. The apparatus of claim 10 wherein said plurality of conductors are longitudinally shaped and located along said inner surface portion of said first conduit so that they are substantially parallel to said electrode.

12. The apparatus of claim 10 wherein said plurality of conductors are substantially ring-shaped and located along said first conduit inner surface portion so that they are substantially around said electrode.

13. The apparatus of claim 1 wherein said means for destructively removing particles from said gas comprises:
 a plurality of conductors positioned at said predetermined location, each of said conductors being spaced from adjacent conductors to form a spark discharge grid;
 means for causing a concentration of said particles between adjacent conductors; and
 means for applying a voltage between adjacent ones of said conductors to generate an electric spark discharge between adjacent ones of said conductors initiated by said concentration of particles located between said adjacent ones of said conductors, said electric spark discharge destructively removing at least a portion of said concentration of particles.

14. The apparatus of claim 13 in combination with an internal combustion engine, wherein said gas and particles are exhaust products of said internal combustion engine, said apparatus further comprising a conduit for containing said flow of exhaust products with flow in the direction of the axis of said conduit, means for mounting said plurality of conductors in said conduit containing said flow of exhaust products.

15. The apparatus of claim 14 wherein said means for causing a concentration of said particles comprises a filter means for passing said gas and tending to block said particles so that said concentration of particles is formed, said filter means being downstream from and abutting said conductors so that said gas will flow therethrough after having passed between said plurality of conductors while blocked particles initiate spark discharges between adjacent conductors.

16. The apparatus of claim 15 wherein said means for applying a voltage comprises:
 a DC power supply having an output voltage terminal and a return terminal; and
 means for applying a portion of a voltage differential across said output voltage terminal and said return terminal to adjacent conductors.

17. The apparatus of claim 16 wherein said means for applying further comprises control means for providing said voltage differential portion across adjacent conductors only during predetermined time intervals.

18. An apparatus for removing particles from a flowing gas containing said particles comprising:
   means for so directing the flowing gas as to pass said particles through a predetermined location; and
   means for destructively removing said particles, said means being constructed and arranged to provide a spark discharge when said particles pass through said predetermined location, said apparatus being connected to an internal combustion engine and said gas and particles are exhaust products of said internal combustion engine, said means for directing said particles through a predetermined location comprises:
   a first conduit for containing said exhaust products with flow in the direction of the axis of said conduit;
   a longitudinally-extending electrode disposed in said first conduit with its axis parallel to the axis of said first conduit;
   means for providing a voltage between said electrode and said first conduit whereby said particles will become charged by, and thus repelled by said electrode, thereby repelling said particles towards an inner surface portion of said first conduit;
   a second conduit in fluid communication with said first conduit;
   means for diverting a portion of said exhaust products adjacent to said inner surface portion of said first conduit into said second conduit; and
   means for locating said means for destructively removing said particles in said second conduit.

19. An apparatus for removing particles from a flowing gas containing said particles comprising:
   means for so directing the flowing gas as to pass said particles through a predetermined location; and;
   means for destructively removing said particles, said means being constructed and arranged to provide a spark discharge when said particles pass through said predetermined location, said apparatus being connected to an internal combustion engine, and said gas and particles are exhaust products from said internal combustion engine, and said means for directing said particles through a predetermined location comprises a conduit for containing said exhaust products with flow in the direction of the axis of said conduit, and said means for destructively removing said particles from said predetermined location comprises:
   filter means located in said conduit for blocking said particles while passing said gas through said conduit;
   a laser; and
   means for directing an output beam from said laser to said filter means for destructively removing said blocked particles from said filter means.

20. The apparatus of claim 19 wherein said means for directing said laser beam comprises a light pipe.

21. The apparatus of claim 19 wherein said means for directing said laser beam comprises fiber-optic means.

22. The apparatus of claim 19 further comprising:
   means for determining the quantity of particles being blocked by said filter; and
   triggering means responsive to said means for determining the quantity of particles for causing said laser to generate said output light beam.

23. The apparatus of claim 22 wherein said means for determining the quantity of particles comprises a flow meter for providing an output signal related to the flow rate of said exhaust products through said filter.

24. The apparatus of claim 22 wherein said means for determining the quantity of particles comprises a differential pressure measuring device for providing an output signal related to a pressure differential of said exhaust products prior to and subsequent to passing through said filter.

25. An apparatus for destructively removing particles from a gas flowing along a predetermined path comprising:
   a plurality of conductors spaced apart a distance from each other in said path of said flowing gas so that said particles can be located therebetween; and
   means for applying a voltage between adjacent conductors, said voltage being sufficiently high for an electric spark discharge to be initiated between adjacent conductors when one of said particles is located therebetween, such that said electric spark discharge envelopes and vaporizes said particle.

26. The apparatus of claim 25 wherein said plurality of conductors are parallel plates oriented parallel to said flow path.

27. The apparatus of claim 26 in combination with a diesel engine wherein said flowing gas comprises exhaust products from said diesel engine, and said plates are positioned less that 125 micrometers apart.

28. An apparatus for destructively removing particles from a flowing gas comprising:
   a conduit having an axis for containing said flowing gas in a direction of said axis;
   a longitudinally-extending electrode positioned along the axis of said conduit;
   a plurality of conductors positioned along the inner surface of said conduit, said conductors being spaced apart on the inner surface of said conduit and parallel to said longitudinally-extending electrode to form a spark discharge grid;
   a DC power supply for applying a voltage between adjacent ones of said conductors, said voltage being sufficiently large to cause an electric spark discharge to be initiated by one of said particles when it passes between adjacent ones of said conductors; and
   means for applying a voltage between said longitudinally-extending electrode and said conduit to charge particles flowing in said conduit with a charge of the same polarity as that of the voltage applied to said electrode, thereby repelling particles toward said spark discharge grid.

29. An apparatus for destructively removing particles from a flowing gas comprising:
   a conduit for containing said flowing gas;
   a filter means located in said conduit for blocking said particles from passing therethrough;
   a laser for generating an output light beam of high intensity to vaporize said particles;
   means for directing said output light beam to said blocked particles; and
   means for triggering said laser to periodically generate said output light beam.

30. The apparatus of claim 29 further comprising:
   means for determining when a predetermined amount of said particles have been blocked by said filter means; and
   said means for triggering comprises means responsive to said means for determining said predetermined amount of said particles for causing said laser to periodically generate said output light beam.

31. Apparatus for destructively removing particles from a flowing gas containing said particles, said apparatus comprising:
   first means for directing said particles to a predetermined location; and
   second means located at said predetermined location for vaporizing said particles so that they will chemically combine with other portions of said flowing gas, thereby destructively removing said particles from said flowing gas, said second means comprising a spark discharge grid of conductors for generating an electric spark discharge enveloping one or more of said particles, and means for applying a voltage across adjacent ones of said conductors to generate an electric spark discharge in the presence of one of said particles.

32. Apparatus for destructively removing particles from a flowing gas containing said particles, said apparatus comprising:
   first means for directing said particles through a predetermined location; and
   second means located at said predetermined location for vaporizing said particles so that they will chemically combine with other portions of said flowing gas, thereby destructively removing said particles from said flowing gas, said second means comprising:
   a filter for blocking passage of said particles;
   a laser for generating an output light beam having a sufficient intensity to vaporize said particles; and
   means for directing said laser light beam at said blocked particles.

33. An apparatus for destructively removing particles from a flowing gas, comprising:
   a plurality of parallel conductors, each of said conductors being spaced from adjacent conductors to form a discharge grid;
   means for directing said flowing gas so that said particles contained therein will pass between said conductors;
   means for producing agglomerations of said particles between said conductors; and
   means for applying a voltage between adjacent ones of said conductors to generate an electric spark discharge initiated by said agglomerations of particles passing between adjacent ones of said conductors, said electric spark discharge destructively removing at least a portion of said agglomerations of particles.

34. The apparatus of claim 33 wherein said apparatus comprises a first conduit within which the flowing gas is contained and said means for directing said flowing gas so that said particles contain therein will pass between said conductors comprises a second conduit containing said plurality of conductors in fluid communication with said first conduit, said apparatus further comprising:
   particle agglomeration means in said first conduit just downstream from said second conduit, for agglomertaing said particles, and
   means for periodically dislodging agglomerated particles from said particle agglomeration means into said second conduit to flow between said plurality of spark discharge grid conductors.

35. The apparatus of claim 34 wherein said means for periodically dislodging agglomerations of particles comprises a means for directing a gas jet across said particle agglomeration means and toward said second conduit.

36. A method for destructively removing particles from a flowing gas, wherein dimensional characteristics of said particles are known, the steps comprising:
   locating a plurality of conductors so that they are spaced apart to form a spark discharge grid;
   applying a voltage between adjacent ones of said conductors that is chosen to be sufficiently high for an electric spark discharge to be initiated between adjacent ones of said conductors when one of said particles is located therebetween; and
   directing said flowing gas so that particles contained therein will pass between said conductors.

37. The method of claim 36 wherein said last step comprises the step of directing all of said flowing gas so that it passes between said conductors.

38. The method of claim 36 wherein said last step comprises the steps of:
   concentrating said particles in a specific portion of said flowing gas; and
   directing said flowing gas portion containing said concentrated particles to said conductors.

39. A method for destructively removing particles from a flowing gas, wherein dimensional characteristics of said particles are known, the steps comprising:
   locating a plurality of conductors so that they are spaced apart to form a spark discharge grid;
   directing said flowing gas so that said particles contained therein will pass between said conductors;
   causing a concentration of said particles to accumulate between said conductors; and
   applying a voltage between adjacent ones of said conductors to generate an electric spark discharge initiated by said concentration of particles located between said conductors, said electric spark discharge destructively removing a portion of said particles.

* * * * *